United States Patent
Nishikata et al.

(10) Patent No.: US 10,189,669 B2
(45) Date of Patent: Jan. 29, 2019

(54) POST-PROCESSING APPARATUS, POST-PROCESSING METHOD AND IMAGE FORMING APPARATUS WITH DETERMINATION OF WHETHER OR NOT TO PERFORM POST-PROCESSING

(71) Applicant: CANON KABUSHIKI KAISHA, Tokyo (JP)

(72) Inventors: Akinobu Nishikata, Abiko (JP); Takashi Yokoya, Yoshikawa (JP); Yutaka Ando, Toride (JP); Akihiro Arai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 15/200,098

(22) Filed: Jul. 1, 2016

(65) Prior Publication Data

US 2017/0043973 A1 Feb. 16, 2017

(30) Foreign Application Priority Data

Aug. 10, 2015 (JP) ................. 2015-158430

(51) Int. Cl.
*B65H 37/00* (2006.01)
*G06K 15/00* (2006.01)
*B65H 43/00* (2006.01)

(52) U.S. Cl.
CPC ............ *B65H 37/00* (2013.01); *B65H 43/00* (2013.01); *G06K 15/4025* (2013.01); *B65H 2301/5152* (2013.01); *B65H 2801/24* (2013.01)

(58) Field of Classification Search
CPC ..... B65H 37/00; B65H 43/00; G06K 15/4025
See application file for complete search history.

(56) References Cited

U.S. PATENT DOCUMENTS

| | | | |
|---|---|---|---|
| 6,339,685 B1 | 1/2002 | Okamoto et al. | |
| 7,878,495 B2 | 2/2011 | Nishimura et al. | |
| 8,262,075 B2* | 9/2012 | Shiraishi | B31F 5/027 270/58.08 |
| 8,393,372 B2 | 3/2013 | Yamauchi et al. | |
| 8,413,978 B2* | 4/2013 | Watanabe | B26F 1/0092 270/58.07 |
| 8,439,340 B2 | 5/2013 | Maenishi et al. | |
| 9,079,743 B2 | 7/2015 | Ando et al. | |
| 9,604,488 B2* | 3/2017 | Sakata | B31F 1/08 |
| 9,785,104 B2* | 10/2017 | Sakata | G03G 15/6544 |
| 2005/0039585 A1* | 2/2005 | Battisti | B26F 1/0092 83/13 |

(Continued)

OTHER PUBLICATIONS

U.S. Appl. No. 15/197,896, filed Jun. 30, 2016.

*Primary Examiner* — Patrick H Mackey
(74) *Attorney, Agent, or Firm* — Venable LLP

(57) ABSTRACT

Provided is a puncher having activating/inactivating switch for post-processing function. The puncher prevents undesirable post processing even if the switch indicates activation of the post processing. When a puncher which is registered in the image forming apparatus is attached to the puncher, the puncher obtains information indicating whether or not to the post processing using a punch die is activated or not. When the obtained information indicates that the post processing using the punch die is inactivated, even if the switch indicates activation of the post processing, the post processing is not performed.

12 Claims, 15 Drawing Sheets

(56) References Cited

U.S. PATENT DOCUMENTS

| | | |
|---|---|---|
| 2007/0047996 A1 | 3/2007 | Oka et al. |
| 2010/0247203 A1 | 9/2010 | Watanabe et al. |
| 2014/0033886 A1* | 2/2014 | Hoover .................... B26D 5/02 83/39 |
| 2016/0379177 A1* | 12/2016 | Nishikata ............... G06Q 10/20 705/305 |

* cited by examiner

PUNCH HOLE

CREASE LINE

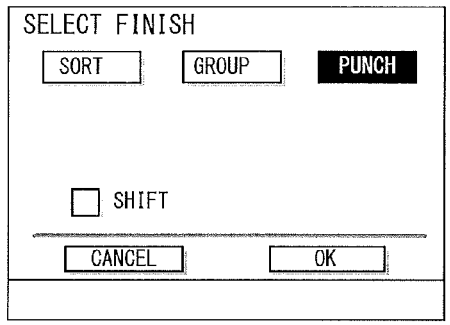
FIG. 9
| SHEET ID | XXX |
|---|---|
| SHEET WIDTH [mm] | YYY |
| SHEET LENGTH [mm] | ZZZ |
| BASIS WEIGHT [gsm] | GGG |
| PUNCH SETTING | ON |
| SHEET TYPE | PLAIN PAPER |
| LAST SHEET FLAG | ON/OFF |
| ⋮ | ⋮ |
FIG. 10A
| SHEET ID | XXX |
|---|---|
| SHEET WIDTH [mm] | YYY |
| SHEET LENGTH [mm] | ZZZ |
| BASIS WEIGHT [gsm] | GGG |
| PUNCH SETTING | OFF |
| SHEET TYPE | PLAIN PAPER |
| LAST SHEET FLAG | ON/OFF |
| ⋮ | ⋮ |
FIG. 10B
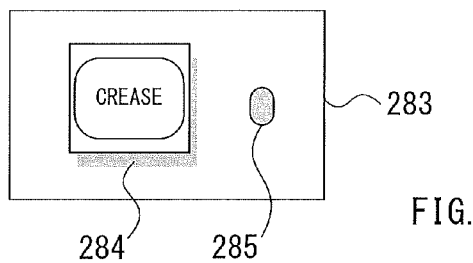
FIG. 11A
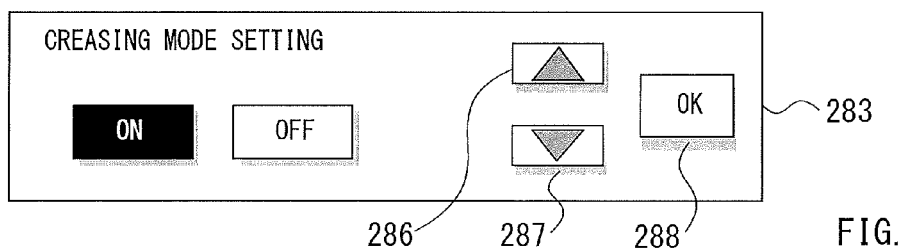
FIG. 11B

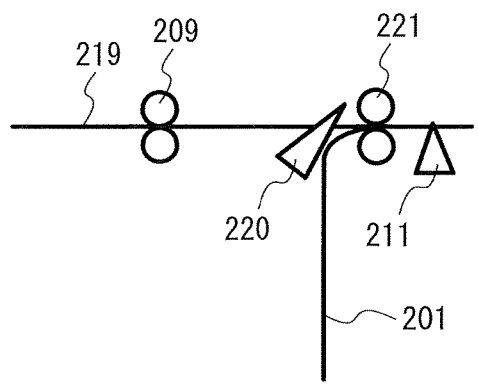
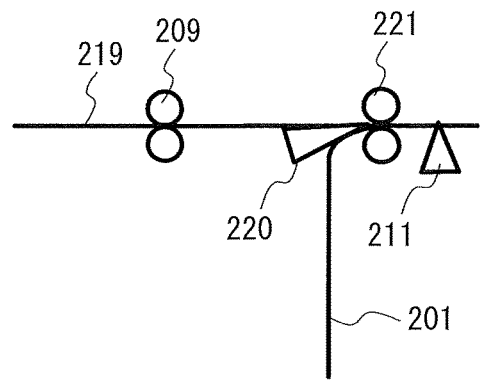
FIG. 13A  FIG. 13B
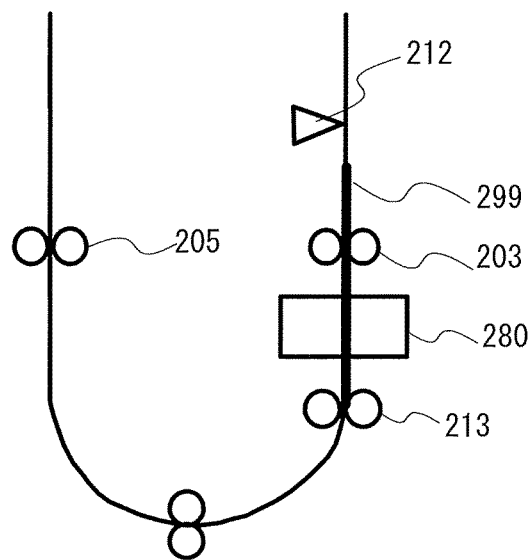
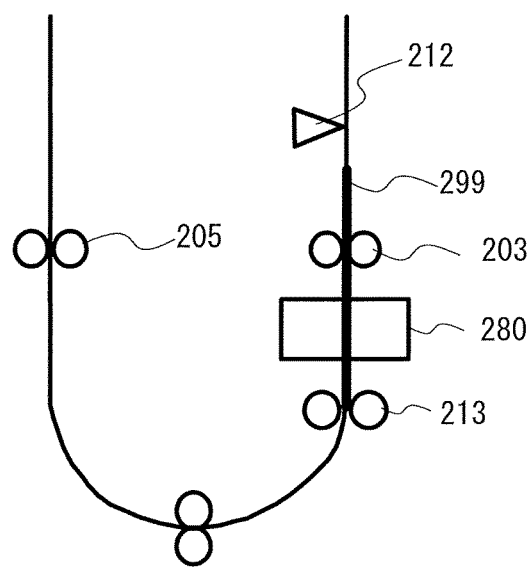
FIG. 14A  FIG. 14B

| CREASE SELECTOR SWITCH SETTING | INFORMATION FROM IMAGE FORMING APPARATUS | SYSTEM OPERATION | |
|---|---|---|---|
| | | ORIGINAL DIE ATTACHED | NEW TYPE DIE ATTACHED |
| ON | ORIGINAL DIE:ON | ON (PUNCH) | – |
| | ORIGINAL DIE:OFF | OFF | – |
| | NEW TYPE DIE :NOT DESIGNATED | – | ON (CREASE) |
| OFF | ORIGINAL DIE:ON | ON (PUNCH) | – |
| | ORIGINAL DIE:OFF | OFF | – |
| | NEW TYPE DIE :NOT DESIGNATED | – | OFF |
FIG. 17
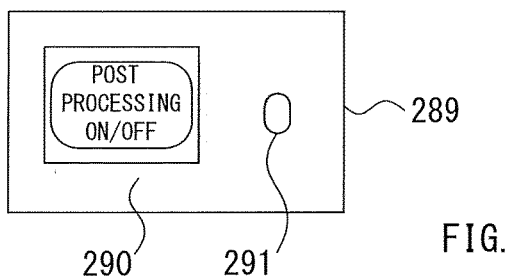
FIG. 18A
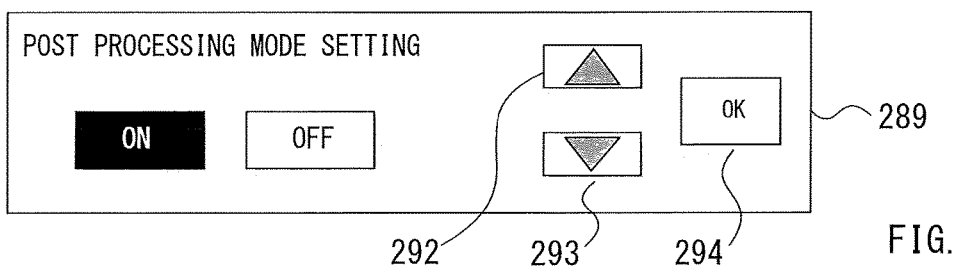
FIG. 18B

| APPARATUS TYPE \ DIE TYPE | DIE 1 | DIE 2 | DIE 3 |
|---|---|---|---|
| IMAGE FORMING APPARATUS A | SUPPORTED | NOT SUPPORTED | NOT SUPPORTED |
| IMAGE FORMING APPARATUS B | SUPPORTED | SUPPORTED | NOT SUPPORTED |
| IMAGE FORMING APPARATUS C | SUPPORTED | SUPPORTED | SUPPORTED |

FIG. 21

| POST PROCESSING MODE SELECTOR SWITCHING SETTING | INFORMATION FROM IMAGE FORMING APPARATUS | SYSTEM OPERATION | |
|---|---|---|---|
| | | SUPPORTED DIE ATTACHED | NOT SUPPORTED DIE ATTACHED |
| ON | SUPPORTED:ON | ON | – |
| | SUPPORTED:OFF | OFF | – |
| | NOT SUPPORTED :NOT DESIGNATED | – | ON |
| OFF | SUPPORTED:ON | ON | – |
| | SUPPORTED:OFF | OFF | – |
| | NOT SUPPORTED :NOT DESIGNATED | – | OFF |

FIG. 22

POST-PROCESSING APPARATUS, POST-PROCESSING METHOD AND IMAGE FORMING APPARATUS WITH DETERMINATION OF WHETHER OR NOT TO PERFORM POST-PROCESSING

BACKGROUND OF THE INVENTION

Field of the Invention

The present invention relates to a post-processing apparatus connected to an image forming apparatus, a post-processing method, and an image forming system.

Description of the Related Art

In a prior image forming system such as a copying machine, a post-processing apparatus for executing post-processing such as a punching process, a stapling process and a sorting process on a sheet conveyed from the image forming apparatus. US2007/047996 (A1) describes a post-processing apparatus which executes, for a sheet conveyed from an image forming apparatus, the punching process at an area near the tip of the sheet in a sheet conveying direction. In the punching process, it may be necessary to change a size and a form of a punch hole and the number of the same.

Therefore, in the post-processing apparatus, by preparing a plurality of punch dies having different numbers and/or different forms of punch holes, a currently used punch die may be replaced with another punch die as required for accommodating changing of the size of the punch holes etc. Further, providing a post-processing apparatus with a function other than a punching, for example, providing a crease die for creasing the sheet, is also proposed.

In a case where various functions are added to the post-processing apparatus, it is also necessary to change hardware and/or software configuration of the image forming apparatus for activating the added functions. Therefore, the quantity of work in developing the image forming apparatus and the post-processing apparatus may be increased. Moreover, the launch day of a new model of the image forming apparatus may be delayed due to the work for additional function. Under the above circumstance, a method of changing the configuration of hardware and/or software accompanied with the added function only in the post-processing apparatus and eliminating need for changing the configuration in the image forming apparatus is known.

As a method for causing the additional function to be activated by the post-processing apparatus only, a method for switching activation/inactivation of the function in the post-processing apparatus independent of the control of the image forming apparatus. In this method, even in a case where a new function is added to the post-processing apparatus, it is possible to activate a new function without need for receiving a notice for executing a new function from the image forming apparatus.

In this method, since it is not necessary to change the configuration of the image forming apparatus, it is possible to build a system easily by combining an existing image forming apparatus and the post-processing apparatus in which a new function is added. In the following description, an image forming system is explained. It is noted that the image forming system includes an image forming apparatus which controls the punching process and the post-processing apparatus which includes a punch die for executing the punching process.

In the post-processing apparatus of the image forming system, a crease function may be added by enabling exchanging of the punch die for executing the punching process with the crease die for executing the creasing process. In this case, a switch for activating/inactivating the post-processing is formed in the post-processing apparatus for allowing the post-processing apparatus to activate/inactivate the post-processing function independently. Therefore, when the punch die is installed in the post-processing apparatus, the punching process is performed, and when the crease die is installed, the creasing process is executed.

A user can select one of the punching process and the creasing process by exchanging the punch die and the crease die as desired. When the punching process is required, the user activates the post-processing by activating the post-processing using an exchange switch with the punch die being installed in the post-processing apparatus.

However, even in a case where the user does not wish to execute the punching process and thus the user does not cause the image forming apparatus to notify the punching process to the post-processing apparatus, the punching process is executed when the punching function is activated in the post-processing apparatus. This is due to a fact that the post-processing apparatus determines activation/inactivation of the post-processing function independent of the image forming apparatus.

It is noted that, before adding the crease function, the user can determine whether the punching process should be executed or not by using the image forming apparatus. However, after the addition of the function, the punching process may be executed against the user's will. Thus, there remains a problem that when the function is activated by the switch of the post-processing apparatus, even if a notification for the punching process is not notified from the image forming apparatus, the punching process is performed.

SUMMARY OF THE INVENTION

According to the present disclosure, there is provided a post-processing apparatus configured to perform post-processing, using an attached post-processing member, on a sheet received from an image forming apparatus, and one of a first post-processing member and a second post-processing member is selectively attached thereto as the post-processing member, comprising: a detection unit configured to detect a type of the attached post-processing member; a control unit configured to control an execution of the post-processing using the attached post-processing member; and a setting unit configured to receive a setting of whether or not to enable the post-processing using the second post-processing member.

The control unit is further configured to: in a case where the post-processing member detected by the detection unit is the first post-processing member and information indicating that the post-processing using the first post-processing member is not to be performed is received from the image forming apparatus, determine not to perform the post-processing using the first post-processing member on the sheet even if the post-processing using the second post-processing member is enabled in the setting unit.

Further features of the present invention will become apparent from the following description of exemplary embodiments with reference to the attached drawings.

BRIEF DESCRIPTION OF THE DRAWINGS

FIG. 9 is a diagram of a finishing selection display.

FIGS. 10A and 10B are diagrams for explaining sheet information.

FIGS. 11A and 11B are diagrams for explaining a crease selector switch.

FIGS. 13A and 13B are partial enlarged views of a puncher.

FIGS. 14A and 14B are partial enlarged views of a puncher.

FIG. 17 is a table representing a system operation in a post-processing.

FIGS. 18A and 18B are diagrams for explaining a mode selector switch.

FIG. 21 is a correspondence table representing model information.

FIG. 22 is a table representing a system operation in a post-processing.

DESCRIPTION OF THE EMBODIMENTS

In the following, an embodiment of the present invention is described in detail with reference to the accompanying drawings.

First Embodiment

Overview

Figure 1:
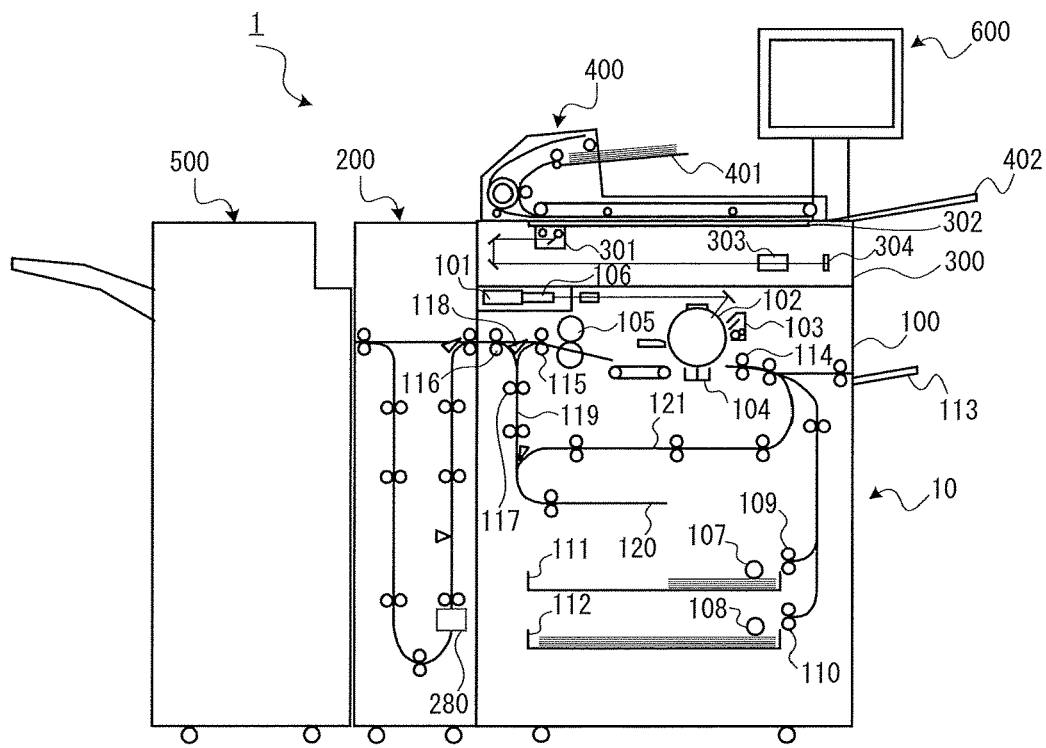
FIG. 1 is a longitudinal section view of a principal part of an image forming system.

FIG. 1 is a longitudinal cross-sectional view of a major portion of an image forming system 1 according to a first embodiment of the present disclosure. The image forming system 1 includes an image forming apparatus 10, a puncher 200 and a finisher 500, both of which are post-processing apparatus, as illustrated in FIG. 1. The image forming system 1 includes a document feeding apparatus 400, an image reader 300 for reading an image of a document, and a printer 100 for forming the read image on a sheet.

The document feeding apparatus 400 sequentially feeds one document, with its surfaces to be read facing upward, on a document tray 401 at a time from the first page in a second direction in FIG. 1. Then, the document is conveyed from leftward position to a rightward position on a platen glass 302 via a curved path and a predetermined reading position. Further, the document feeding apparatus 400 discharges the document towards an output tray 402 provided external to the document feeding apparatus 400. The above described "reading position" is a predetermined reading position of the platen glass 302 provided at the image reader 300, and the scanner unit 301 is fixed to this position.

A document image is read by the scanner unit 301 held in a position corresponding to the reading position, when the document passes the reading position on the platen glass 302 from left to right. When a document passes the reading position, light from the lamp of the scanner unit 301 is irradiated on a reading surface of the document, and the reflected light from the document is led to a lens 303 through a mirror. The light which passed this lens 303 forms image on an imaging surface of the image sensor 304.

The image sensor 304 converts the optically read image data and output the same. The image data output from the image sensor 304 is input to an exposure unit 101 of the image forming apparatus 10 as a video signal. The exposure unit 101 of the image forming apparatus 10 modulates laser light based on the video signal input by the image reader 300, and outputs the modulated laser light. The laser light is irradiated, with the polygon mirror 106, on a photosensitive drum 102 to scan the same. An electrostatic latent image is formed on the surface of the photosensitive drum 102 according to the scanned laser light. The electrostatic latent image on the photosensitive drum 102 is developed and made visible by the development agent supplied from a developing unit 103.

On the other hand, from an upper cassette 111 or a lower cassette 112 provided in the image forming apparatus 10, the sheet is fed to pick up rollers 107 and 108. The fed sheet is conveyed to a registration roller 114 by feeding rollers 109 and 110. When the tip of the sheet reaches to the registration roller 114, a registration roller 114 is driven at a desired timing. Further, the sheet is conveyed between the photosensitive drum 102 and the transferring unit 104 at a timing synchronized with starting of irradiation of laser light. The visible image respectively formed and developed on the photosensitive drum 102 is transferred on the fed sheet by the transferring unit 104. The transferred sheet is conveyed to the fixing unit 105, and the fixing unit 105 fixes the sheet by applying heat and pressure on the sheet. The sheet which passed the fixing unit 105 is discharged, via a flapper 118 and a discharge roller 116, from the image forming apparatus 10 towards the exterior of the image forming apparatus 10 (or puncher 200).

Here, when discharging the sheet with its image forming surface being downward (face down), the sheet which passed the fixing unit 105 is once led in a reversal path 119 by switching an operation of a flapper 118. After the back end of the sheet passed the flapper 118, the sheet is switched back and to discharge it from the image forming apparatus 10 with the discharge roller 116. This discharging form is called reversal discharging.

Further, when a duplex mode in which images are formed on both sides of the sheet is set, after leading the sheet to the reversal path 119 and a duplex reversal path 120 with the switching operation of the flapper 118, the sheet is conveyed to the duplex conveyance path 121. Then, a control operation for feeding the sheet, which is led to the duplex conveyance path 121 at the timing described above, between the photosensitive drum 102 and the transferring unit 104 is executed.

(Whole System Block)

Figure 2:
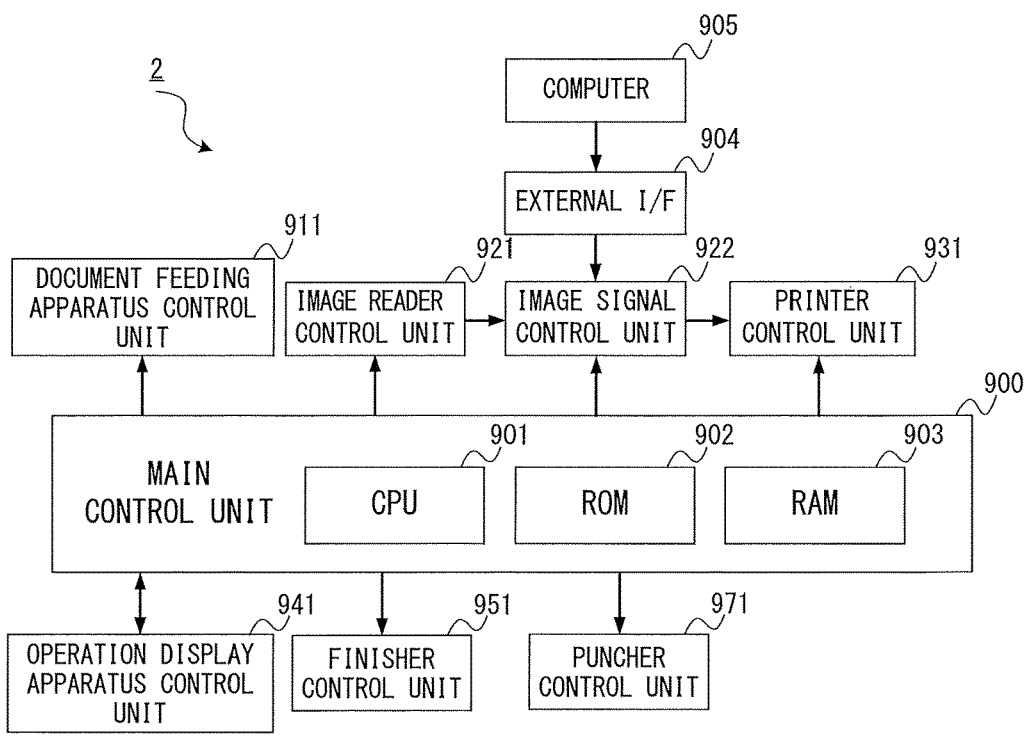
FIG. 2 is a diagram for illustrating a functional block of a controller.

Then, referring to FIG. 2, a description is made for the configuration of the controller which controls the whole image forming system 1 and for the whole system block. FIG. 2 is a functional block diagram for illustrating the configuration of a controller 2 which controls the whole image forming system 1 in FIG. 1. The controller 2 includes a main control unit 900 which includes a CPU circuit unit, a document feeding apparatus control unit 911, a reader control unit 921, an signal control unit 922, a printer control unit 931, an operation display apparatus control unit 941, and an external I/F 904.

The main control unit 900 includes a CPU 901, a ROM 902, and a RAM 903. The CPU 901 executes basic control of the whole image forming system. The ROM 902 in which the control program is written and the RAM 903 in which processes are executed are connected, via an address bus and a data bus, to the CPU 901. The CPU 901 totally controls each of control units 911, 921, 922, 931, 941, and 904 with the control program stored in ROM 902. The RAM 903 holds control data temporarily. Further, the RAM 903 is used as workspace of the operation process accompanying control. Moreover, the main control unit 900 communicates with a finisher control unit 951 and a puncher control unit 971, both of which are provided in the puncher 200.

The document feeding apparatus control unit 911 controls an operation of the document feeding apparatus 400 based on the instructions from the main control unit 900. The reader control unit 921 controls the operation of the scanner unit 301 and the image sensor 304 etc., described above, and transmits an image signal output from the image sensor 304 to the signal control unit 922.

The signal control unit 922 executes each process, after converting the analog image signal from the image sensor 304 into a digital signal, converts this digital signal into a video signal, and outputs the digital signal to the printer control unit 931. Further, the signal control unit 922 executes various processes to a digital image signal input through the external I/F 904 from an external apparatus such as a computer 905 etc., and converts this digital image signal and outputs the converted digital signal to the printer control unit 931. The main control unit 900 controls the operation of the signal control unit 922.

The printer control unit 931 controls the exposure unit 101 and the image forming apparatus 10 based on the input video signal, and executes image forming and sheet conveying. In the present embodiment, the document feeding apparatus control unit 911, etc., described above, are provided in the image forming apparatus 10. The operation display apparatus control unit 941 communicates information between the operation display apparatus 600 and the main control unit 900. The operation display apparatus 600 includes a plurality of keys to set various functions related to image forming and a display unit for displaying information representing a setting state. The key signal corresponding to operation of each key is output to the main control unit 900, and, based on the signal from the main control unit 900, the corresponding information is displayed on the operation display apparatus 600.

On the other hand, in the present embodiment, the puncher control unit 971 is installed in a puncher 200 to control the same. In this case, the puncher control unit 971 communicates with the main control unit 900 to transmit and/or receive information. The details of the control are described later. The finisher control unit 951 is installed in the finisher 500 to control the same. In this case, the finisher control unit 951 communicates with the main control unit 900.

Operation Display Apparatus.

Figure 3:
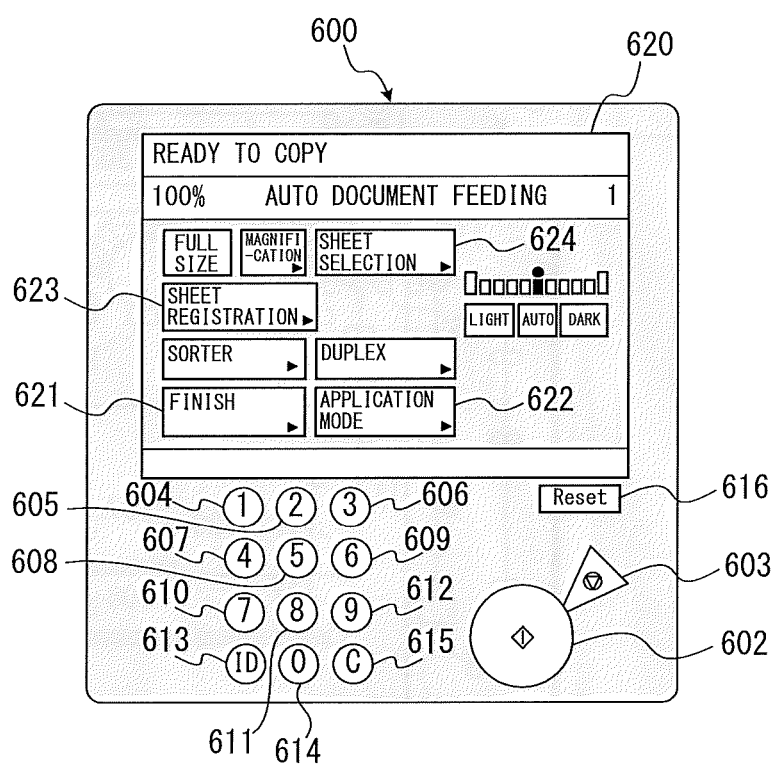
FIG. 3 is a diagram of an operation display apparatus.

FIG. 3 is a diagram illustrating the operation display apparatus 600 of the image forming apparatus 10 in FIG. 1. In the operation display apparatus 600, a start key 602 for starting an image forming operation, a stop key 603 for interrupting image forming operation, and numeric keys 604-612 and 614 for executing a numerical input are provided. Further, an ID key 613, a clear key 615, and a reset key 616 etc., are provided on the operation display apparatus 600. In the upper part of the operation display apparatus 600, a display unit 620 on which a touch panel is formed is provided, thus, it is also possible to display a soft key on a screen. Further, in the operation display apparatus 600, an application mode key 622 for setting advanced functions, such as a duplex copy, and a sheet registration key 623 for registering a type of sheet, such as pasteboard and an OHP sheet are provided.

The image forming apparatus 10 includes certain process modes as post-processing modes, such as a non sorting mode, a sorting mode, a shift sorting mode, a staple sorting mode (binding mode), and a punch mode. The setting of the process mode is performed through an input operation by the user via the operation display apparatus 600. In this embodiment, though the image forming apparatus 10 supports the punch mode, the crease mode in which a crease die is attached to a puncher 200 to form a crease line on a sheet is not supported. In detail, though the punch die is registered in the image forming apparatus 10, the crease die is not registered in the same. Therefore, the image forming apparatus 10 can provide information for designating whether or not to execute a punching process using the punch die to a CPU 972. However, the image forming apparatus 10 does not provide information for designating whether or not to execute a creasing process using the crease die to the CPU 972.

(Puncher)

Figure 4:
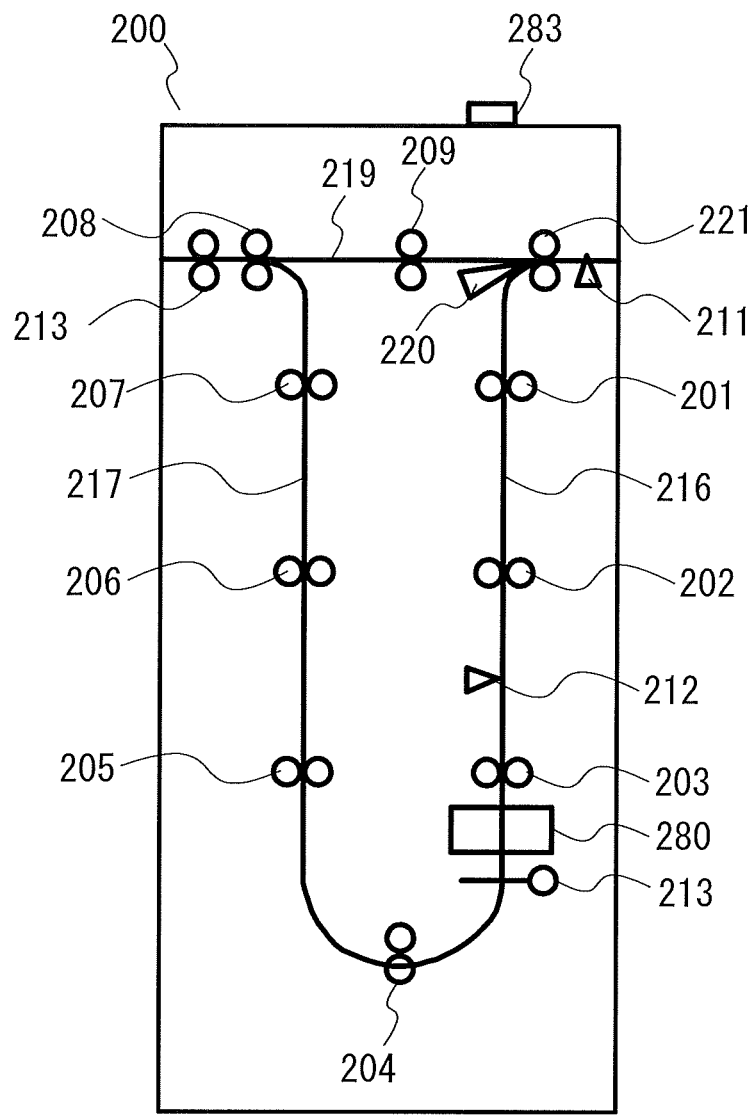
FIG. 4 is an overall sectional view of a puncher.

Next, the configuration of the puncher 200 is described with reference to FIGS. 4 and 5. FIG. 4 is a whole sectional view of the puncher 200 illustrated in FIG. 1. The puncher 200 sequentially receives the sheets discharged from the image forming apparatus 10, and executes the punching process on the received sheets. Based on the sheet information notified from the image forming apparatus 10, it is determined whether to execute the punching process or not, which is described later. Further, the puncher 200 can execute, by providing the crease die in it, the creasing process on the sheet discharged from the image forming apparatus 10. The puncher control unit 971 determines whether to execute the creasing process or not, based on a setting of a crease selector switch 283 on the puncher 200, which is described later.

In this embodiment, either a punch die or a crease die is provided in the puncher 200. However, it is also possible to provide, not limited to the punch die or crease die, a die of any type to execute various processes to the sheet.

When executing neither the punching process nor the creasing process to the sheet discharged from the image forming apparatus 10, a conveyance roller 221 and a flapper 220 lead the sheet to a through pass 219. Thereafter, the sheet is conveyed to a finisher 500 via conveying rollers 208 and 209.

Figure 6A:
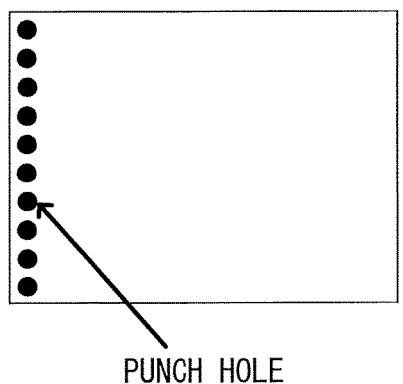
FIG. 6A is a diagram for illustrating a sheet to which a punching process was executed.
Figure 6B:
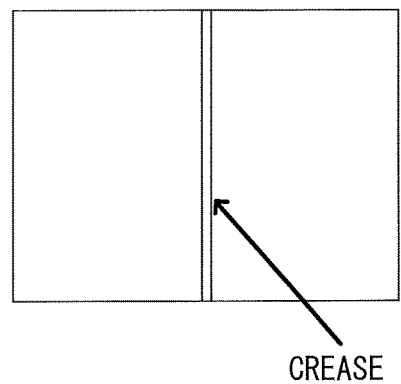
FIG. 6B is a diagram of a sheet to which a creasing process is executed.

When executing the punching process or the creasing process to the sheet discharged from the image forming apparatus 10, the sheet is conveyed to the punch path 216 by a conveyance roller 221 and a flapper 220. The sheet conveyed via a punch path 217 by the conveyance rollers 201, 202, and 203 is stopped in a predetermined position. Then, the punching process or the creasing process is executed on the sheet by the punch unit 280 to generate the sheet as illustrated in FIGS. 6A and 6B. The above predetermined position varies depending on a punch position or a position to be creased.

The example illustrated in FIG. 6A illustrates the sheet to which the punching process has been executed. In this example, punch holes are formed on the sheet in a line at the left side of FIG. 6A. The example illustrated in FIG. 6B illustrates the sheet on which the creasing process has been executed. In this example, two crease lines are formed on the center of the sheet. Since the crease lines are formed on the sheet, It is easy to fold the sheet along the crease lines. In the present embodiment, the sheet is nipped by the roller 213 to stop the sheet. Further, the punch unit 280 is configured so that two or more types of dies, such as a punch die and a crease die, are replaceable.

Any punch dies having various shapes and various numbers of punch holes may be used as the punch die for the punch unit 280. Therefore, another punching process which is different from that illustrated in FIG. 6A may be executed on a sheet. Further, in the punch unit 280, by replacing the punching die with the crease die, it is possible to provide the creased sheet as illustrated in FIG. 6B. Further, it is possible to prepare the crease die for forming the crease line of various form or number. Thereby, a crease line other than that illustrated in FIG. 6B may be formed on the sheet.

After either the punching process or the creasing process has been executed in the punch unit 280, the sheet is conveyed to the finisher 500 via the conveying rollers 204, 205, 206, 207, 208 and punch path 217. Conveyance sensors 211, 212 and 213 are provided on each of paths 216 and 219 to detect passing of the sheet.

(Puncher Block Diagram)

Next, the configuration of the puncher control unit 971, which controls the driving of the puncher 200, is described with reference to FIG. 5. FIG. 5 is a block diagram illustrating the configuration of the puncher control unit 971 in FIG. 2. In FIG. 5, the puncher control unit 971 includes a CPU 972, a ROM 973, and a RAM 974, as illustrated in FIG. 5. The puncher control unit 971 communicates with the main control unit 900 provided in the image forming apparatus 10 using a communication IC, which is not illustrated. Thus, the puncher control unit 971 transmits and receives information of a process to be performed and a notice of delivery of a sheet etc. The process to be executed includes the punching process, the creasing process etc.

With an instruction from the main control unit 900, the puncher control unit 971 executes various programs stored in ROM 973, and controls the driving of the puncher 200. Further, the puncher control unit 971 communicates with, via the die memory communication unit 281, the die memory 282 which is set to the punch unit 280. When reading and writing of the information stored in the die memory 282 has been correctly executed, the CPU 972 recognizes that the die is set.

Hereinafter, a description is made for various input and output provided in the puncher 200. The puncher 200 includes, for conveyance of a sheet, a through pass conveyance motor M21, which drives conveyance rollers 208, 209 and 221, and a punch path discharge motor M22 which drives the conveyance rollers 201-207. Moreover, the puncher 200 includes a solenoid SL1 and conveyance sensors 211-213, which drive a flapper 220 for switching through pass 209 and the punch path 216. The puncher 200 includes a punch motor M25 for executing the punching process and the creasing process on the conveyed sheet in the punch unit 280, and includes a crease selector switch 283 for switching enabling/disabling of the creasing process. In addition, the crease selector switch 283 is enabled only when the crease die is set.

(Finisher)

Figure 7:
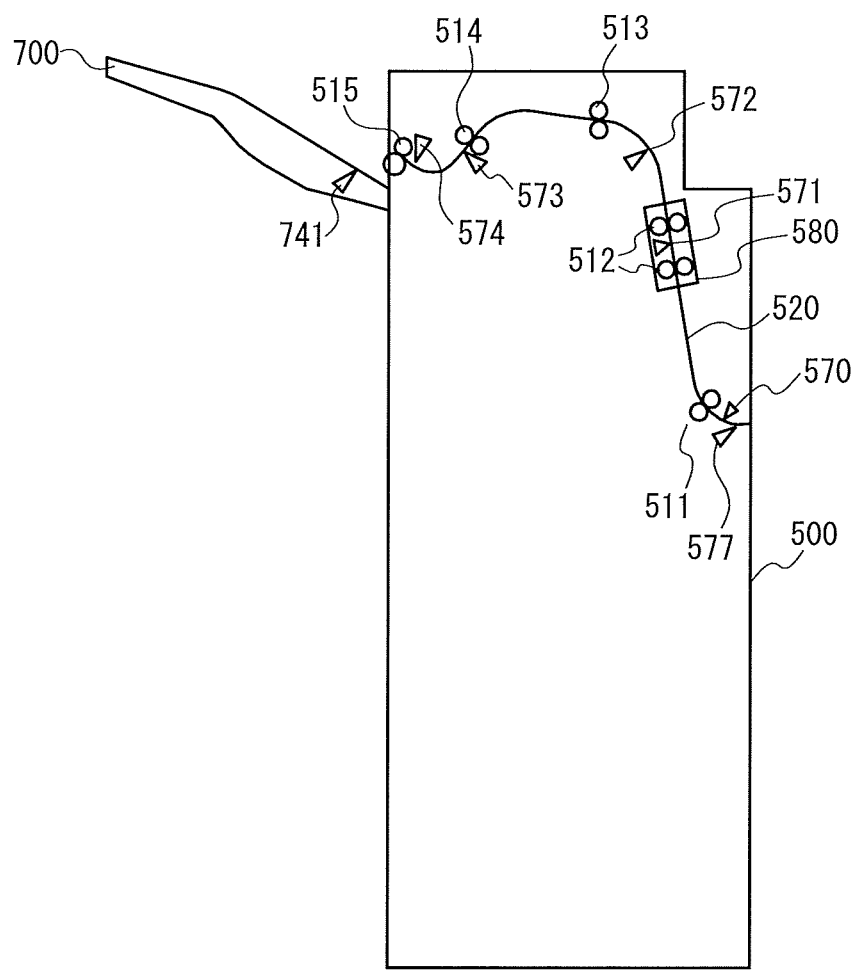
FIG. 7 is a sectional view of a finisher.

Next, the configuration of the finisher 500 is described with reference to FIG. 7. FIG. 7 is a sectional view of the finisher illustrated in FIG. 1. In addition, unless otherwise noted, each of the conveyance of the sheet in the finisher 500 and the detection by following conveyance sensors, etc., is controlled by a finisher control unit 951, which is described later.

The finisher control unit 951 causes a conveyance roller 511 to convey the sheet which is discharged from the puncher 200 to the conveyance path 520. The sheet conveyed into the finisher 500 is conveyed towards a stacking tray 700 through the conveyance rollers 512, 513, 514, and 515. Conveyance sensors 570, 571, 572, 573 and 574 are provided on the conveyance path 520 to detect passing of the sheet. A conveyance roller 512 and a conveyance sensor 571 are provided in the shift unit 580. The shift unit 580 is driven by a shift motor M4, and is movable along a width direction which is perpendicular to the conveyance direction.

When the sheet has been conveyed to the shift unit 580, a horizontal end sensor 577 detects an end (horizontal end) of the sheet in a width direction. Then, the position of the sheet in a width direction is adjusted based on a value detected by a horizontal end sensor 577, and the sheet is conveyed downstream. When no shift is designated, the sheet is conveyed without offsetting. If it is detected that the sheet has passed the shift unit 580 based on the input of the conveyance sensor 571, the shift motor M4 is driven to return the shift unit 580 to a center position. After the above shift operation, the sheet is discharged, by the conveyance rollers 513, 514, and 515, to the stacking tray 700. A sheet sensor 741 is provided on the stacking tray 700 to detect whether there is any stacked sheet or not.

(Finisher Block Diagram)

Figure 8:
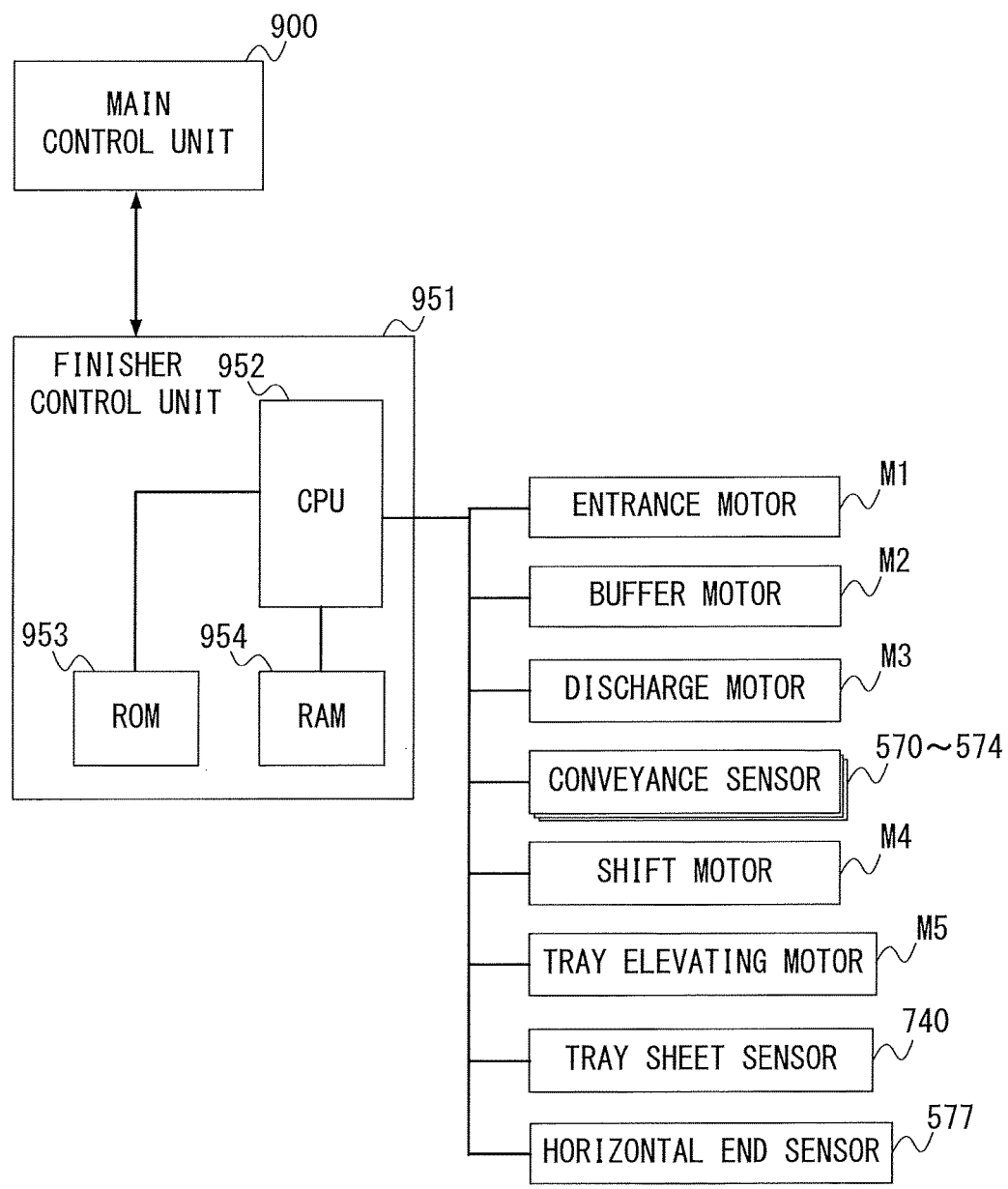
FIG. 8 is a functional block diagram of a finisher.

Next, the configuration of the finisher control unit 951, which controls the driving of the finisher 500, is described with reference to FIG. 8. FIG. 8 is a block diagram illustrating the configuration of the finisher control unit 951 in FIG. 8.

The finisher control unit 951 includes a CPU 952, a ROM 953, a RAM 954, etc., as illustrated in FIG. 8. The finisher control unit 951 communicates with the main control unit 900 provided in the image forming apparatus 10 using a communication IC, which is not illustrated. Thus, the finisher control unit 951 transmits and receives information of a process to be performed and a notice of delivery of a sheet etc. Further, with an instruction from the main control unit 900, the finisher control unit 951 executes various programs stored in ROM 953, and controls the driving of the finisher 500.

Hereinafter, a description is made for various input and output provided in the finisher 500. The finisher 500, for conveying the sheet, includes an entrance motor M1 for driving the conveyance rollers 511-515, a buffer motor M2, a discharge motor M3, and the conveyance sensors 570-574. In order to correct a deviation amount of the conveyed sheet and a conveyance center position, a shift motor M4 and a horizontal end sensor 577 is provided. Further, for a unit for moving up and down the stacking tray 700, a tray elevating motor M5 and a tray sheet sensor 740 are provided.

(Operation Unit Setting of Punching Process)

Hereinafter, a description is made for procedures for setting the operation display apparatus 600 with reference to FIGS. 3, 9, 10A and 10B. In order to set the punching process, the user pushes the finish key 621 on the display unit 620 of the operation display apparatus 600 illustrated in FIG. 3. When it is determined that the finish key 621 is pushed based on the output information from the operation display apparatus control unit 941, the CPU 901 controls the screen of the display unit 620 to change the screen of the display unit 620 into a finish selection screen illustrated in FIG. 9.

As illustrated in FIG. 9, graphical images of buttons representing "sorting", "group", and "punch" are displayed on the finish selection screen to allow selection of the finishing process. In FIG. 9, since "punch" button is pushed by the user, "punch" button is highlighted. In this state, as the user push "OK" button, the punching process is set as a post-processing, then, the screen is changed into an initial screen. It is noted that, in the finish selection screen, when a button other than "punch" is pushed, the finish process corresponding to the pushed button is set.

If a process for print or copy etc., is started after the setting of punching process as the post-processing, the main control unit 900 notifies a puncher 200 of the sheet information illustrated in FIG. 10. When the punch process is set, the sheet information illustrated in FIG. 10A is notified, and, when the punch process is not set, the sheet information illustrated in FIG. 10B is notified. The punch setting is "enabled" in FIG. 10A, while the punch setting is "disabled" in FIG. 10B. In these figures, a common setting is used except for the punch setting.

(Setting of Creasing Process)

FIGS. 11A and 11B are diagrams of the crease selector switch for setting the crease mode. As described above, the punch die is provided in the image forming apparatus 10. However, the creasing process can be executed by exchanging this punch die for a crease die. As illustrated in FIG. 11A, the crease selector switch 283 is provided for the puncher 200. The crease selector switch 283 includes the crease key 284 for switching enabling/disabling of the creasing process. If the crease key 284 is pressed once, the crease mode is enabled and post-processing using the crease die is set to be enabled. Further, if the crease key 284 is pressed again, the crease mode is set to be disabled, and the post-processing using the crease die is disabled. In addition, the puncher 200 is provided with LED 285 which is turned on upon enabling the crease mode.

When the sheet on which the print process etc., is executed is discharged from the image forming apparatus 10 and conveyed to the puncher 200, the CPU 972 of the puncher control unit 971 determines whether the crease die is attached or not. Further, the CPU 972 determines whether the crease mode is set to be enabled or not. When the crease mode is set to be enabled, the puncher control unit 971 executes the creasing process. When the crease mode is set to be disabled, or when the crease die is not attached, the puncher control unit 971 does not execute the creasing process.

In addition, as illustrated in FIG. 11B, the crease selector switch may be constituted with a simple display unit and a simple soft key. In this constitution, the user calls the setting screen for the crease mode by using an up key 286 and a down key 287. For enabling the crease mode, the user causes "ON" button to be in a selected state and pushes "OK" key 288. For disabling the crease mode, the user causes "OFF" button to be in a selected state and pushes "OK" key 288. Thus, the user can determine whether the crease mode is to be enabled or disabled. The puncher control unit 971 enables or disables the crease mode in response to the input from a user, and then the creasing process is executed as described above.

(Puncher Operation)

Then, the control process executed, when the puncher 200 executes the post-processing, by the CPU 972 is described with reference to FIGS. 4 and 12-14. Here, FIG. 12 is a flow chart for the processing executed, when the puncher 200 executes the post-processing 601, by the CPU 972, and FIGS. 13A, 13B, 14A and 14B are partial enlarged views of the puncher illustrated in FIG. 4.

Figure 12:
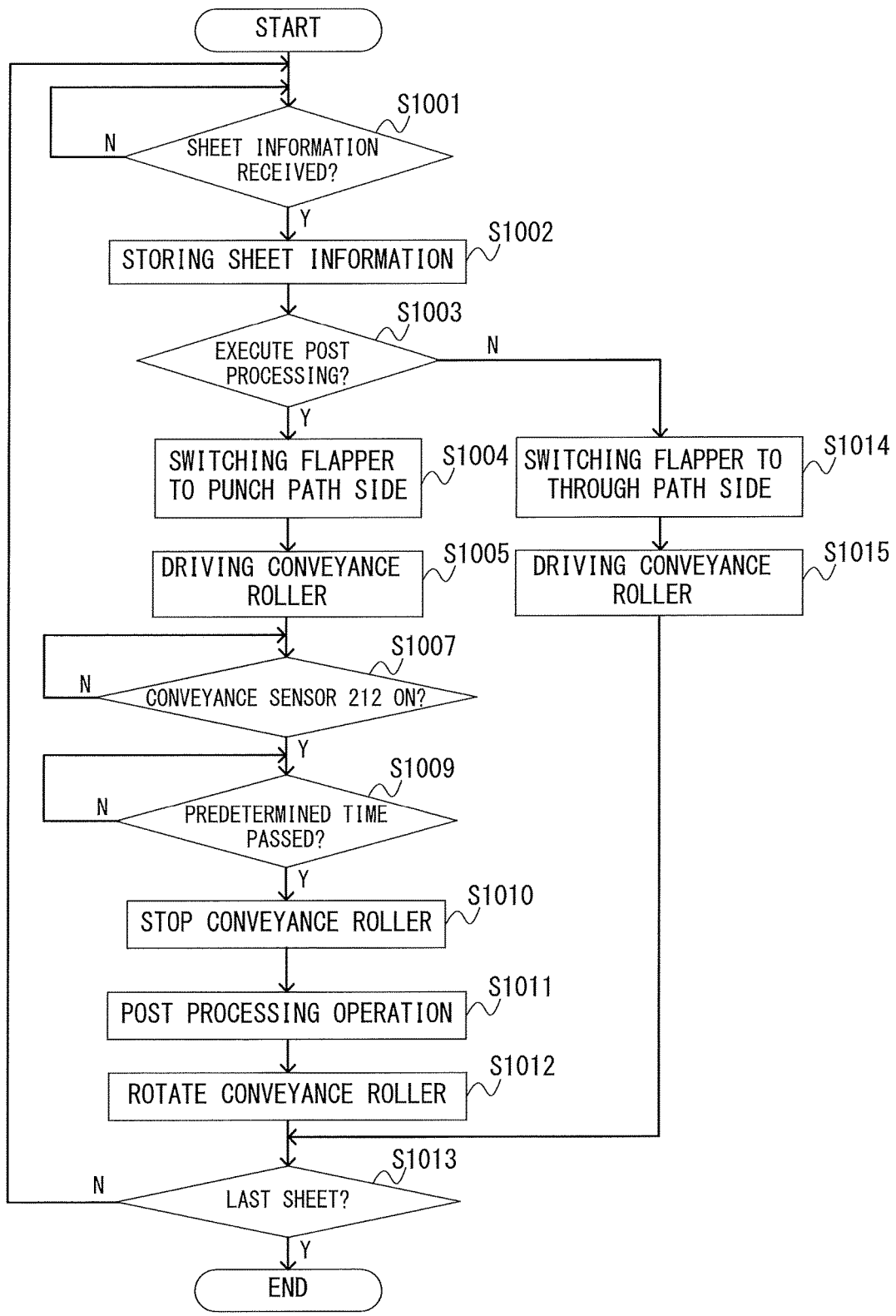
FIG. 12 is a flowchart for illustrating operations executed by a puncher.

As shown in FIG. 12, the CPU 972 determines whether or not the sheet information is received from the image forming apparatus 10 (Step S1001). When the sheet information is not received (Step S1001: N), S1001 is executed again. When the sheet information is received (Step S1001: Y), the received sheet information is stored in the RAM 974 (Step S1002) and transmitted to the finisher 500.

In order to lead the sheet to a conveyance path according to the sheet information and the setting of the crease selector switch 283, CPU 972 determines whether to execute the post-processing mode (Step S1003), and determines an operation of the flapper 220. It is noted that, in the post-processing mode, the punching process or the creasing process is executed. The punching process and the creasing process are described later.

When the CPU 972 determines to execute the post-processing in S1003 (Step S1003: Y), it turns ON a solenoid SL1. Then, as illustrated in FIG. 13A, the flapper 220 is switched to the punch path 216 side (Step S1004). In order to convey the sheet on the punch path, the CPU 972 rotates the conveyance rollers 201-209 and 221 by driving the through pass conveyance motor M21 and the punch path discharge motor M22 (Step S1005).

The CPU 972 determines whether the conveyance sensor 212 is ON or not (Step S1007). When the conveyance sensor 212 is not ON (Step S1007: N), the CPU 972 executes S1007 again.

Then, the CPU 972 determines whether a predetermined time has passed since the conveyance sensor 212 is set to ON or not (Step S1009). The predetermined time corresponds to a period according to the distance between the position of the conveyance sensor 212 and the position at which the sheet is stopped. Further, the predetermined time varies depending on the punch position in the punching process or the crease position in the creasing process. When the predetermined time has not passed (Step S1009: N), S1009 is executed again. When the predetermined time has passed (Step S1009: Y), the CPU 972 stops the punch path discharge motor M22 (Step S1010) to stop the rotation of the conveyance rollers 201-209 and 221. Then, the CPU 972 drives the punch motor M25 to execute the post-processing operation (Step S1011). After the completion of the post-processing operation, by driving the punch path discharge motor M22, the CPU 972 rotates the conveyance rollers 201-209 and 221 (Step S1012) to convey the sheet to the finisher 500 at the downstream side.

CPU 972 determines whether the sheet is the last sheet or not (Step S1013). When it is determined that the sheet is not the last sheet (Step S1013: N), the CPU 972 returns again to the process of S1001. When it is determined that the sheet is the last sheet (Step S1013: Y), the CPU 972 ends the process. Further, when it is determined that no post-processing mode is to be executed (Step S1003: N), the CPU 972 turns OFF the solenoid SL1, as illustrated in FIG. 13B, and the flapper 220 is switched to the through pass 219 side (Step S1014). This mode is called "through pass conveyance mode". Then, in order to convey the sheet on the through pass, the CPU 972 drives the through pass conveyance motor M21, drives the conveyance rollers 208, 209 and 221 (Step S1015), and executes S1013 described above.

(Die Communication Process)

Figure 5:
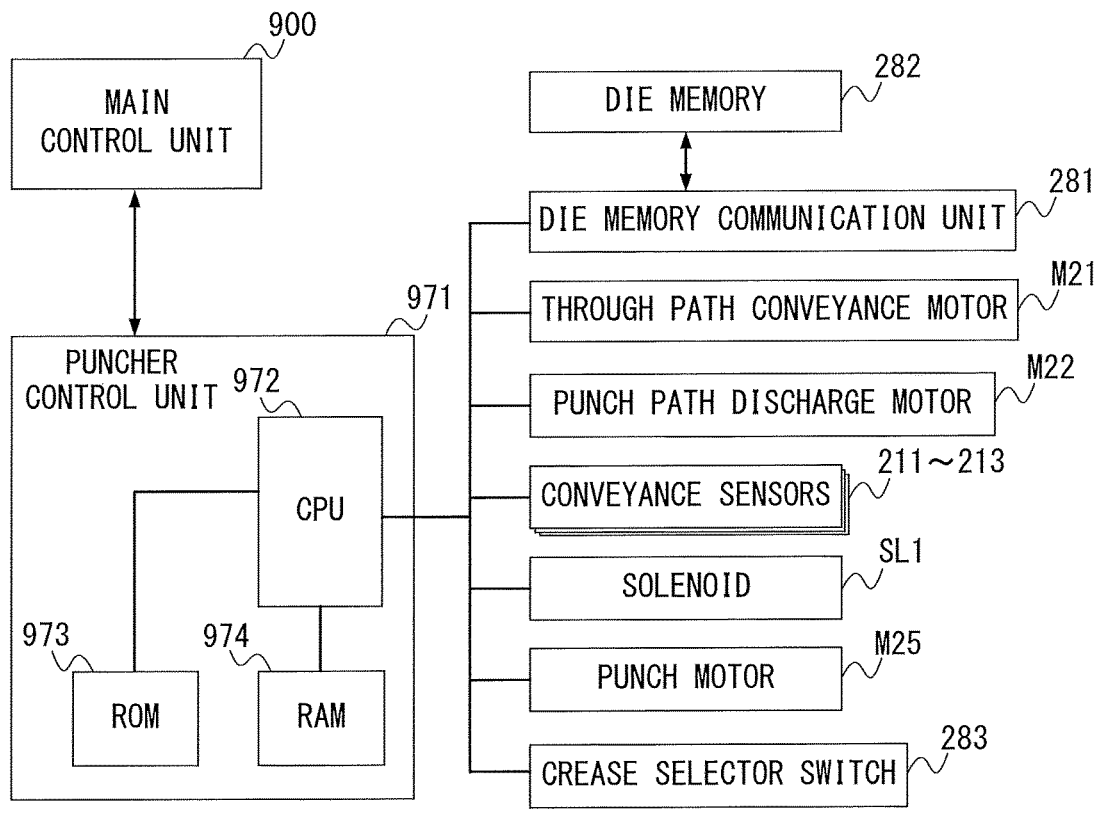
FIG. 5 is a block diagram of a puncher.
Figure 15:
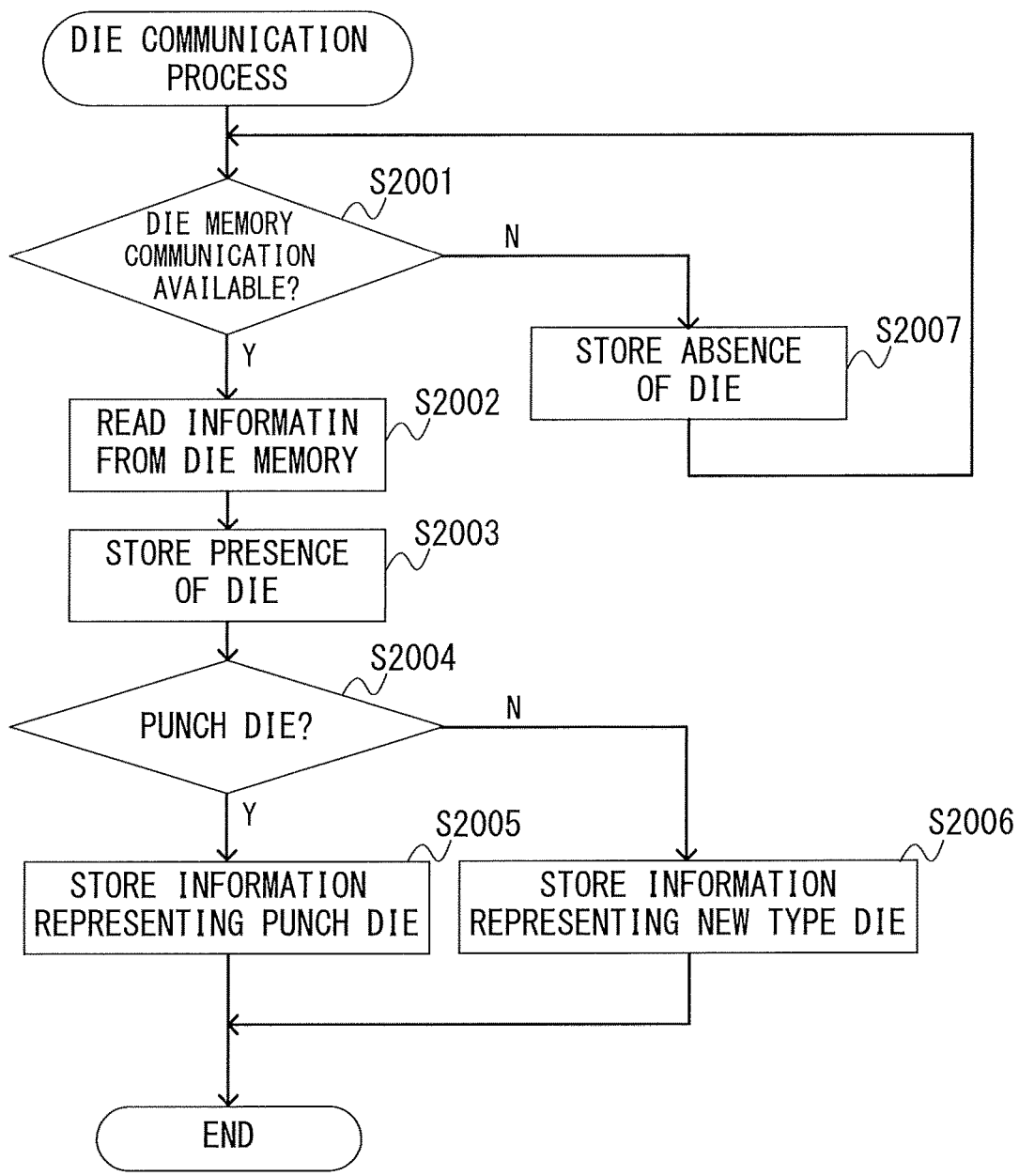
FIG. 15 is a flowchart for illustrating a die communication process.

The control process executed in the die communication process by the CPU 972 in the puncher control unit 971 illustrated in FIG. 5 is illustrated in the flow chart of FIG. 15. In this embodiment, the die memory 282 is provided for the punch die and the crease die. In the die memory 282, information representing that the die is attached, and information for distinguishing the punch die from the crease die are stored.

Further, the CPU 972 stores, with reference to the information read from die memory 282, die information on RAM 974 as information related to the die attached to the punch unit 280. In the die information, the type of the attached die is stored. In this embodiment, information representing whether the attached die is the punch die or not is stored. The CPU 972 determines whether the communication with the die memory 282 provided in the die is available or not (Step S2001). When the communication is not available (Step S2001: N), the CPU 972 determines that no die is attached, and stores information representing absence of the die in the RAM 974 (Step S2007), and executes S2001 again.

When the communication is available (Step S2001: Y), the CPU 972 reads information from the die memory 282 (Step S2002), and stores information representing that the die is attached in the RAM 974 (Step S2003). Then, the CPU 972 determines whether the attached die is the punch die or not (Step S2004). When the attached die is the punch die (Step S2004: Y), the CPU 972 stores information representing that the attached die is the punch die on the RAM 974 (Step S2005), and ends the process.

When the attached die is not the punch die (Step S2004: N), the CPU 972 stores information representing that the attached die is not the punch die on the RAM 974 (Step S2006), and ends the process. In this embodiment, the CPU 972 stores information representing that the punch die is exchanged with another die, i.e., new type die, as the die information. It is noted that the new type die is not the punch die originally attached to the puncher 200. Therefore, when the crease die is attached, the CPU 972 stores information representing that the new type die is attached as the die information. Thus, the CPU 972 serves as a detection unit configured to detect whether the attached die is the punch die or the crease die. As described above, the CPU 972 determines whether a die is attached or not and determines the type of the attached die, and stores the result in the RAM 974. The information is notified to the main control unit 900 if necessary.

(Post-Processing Mode Determination Process)

Figure 16:
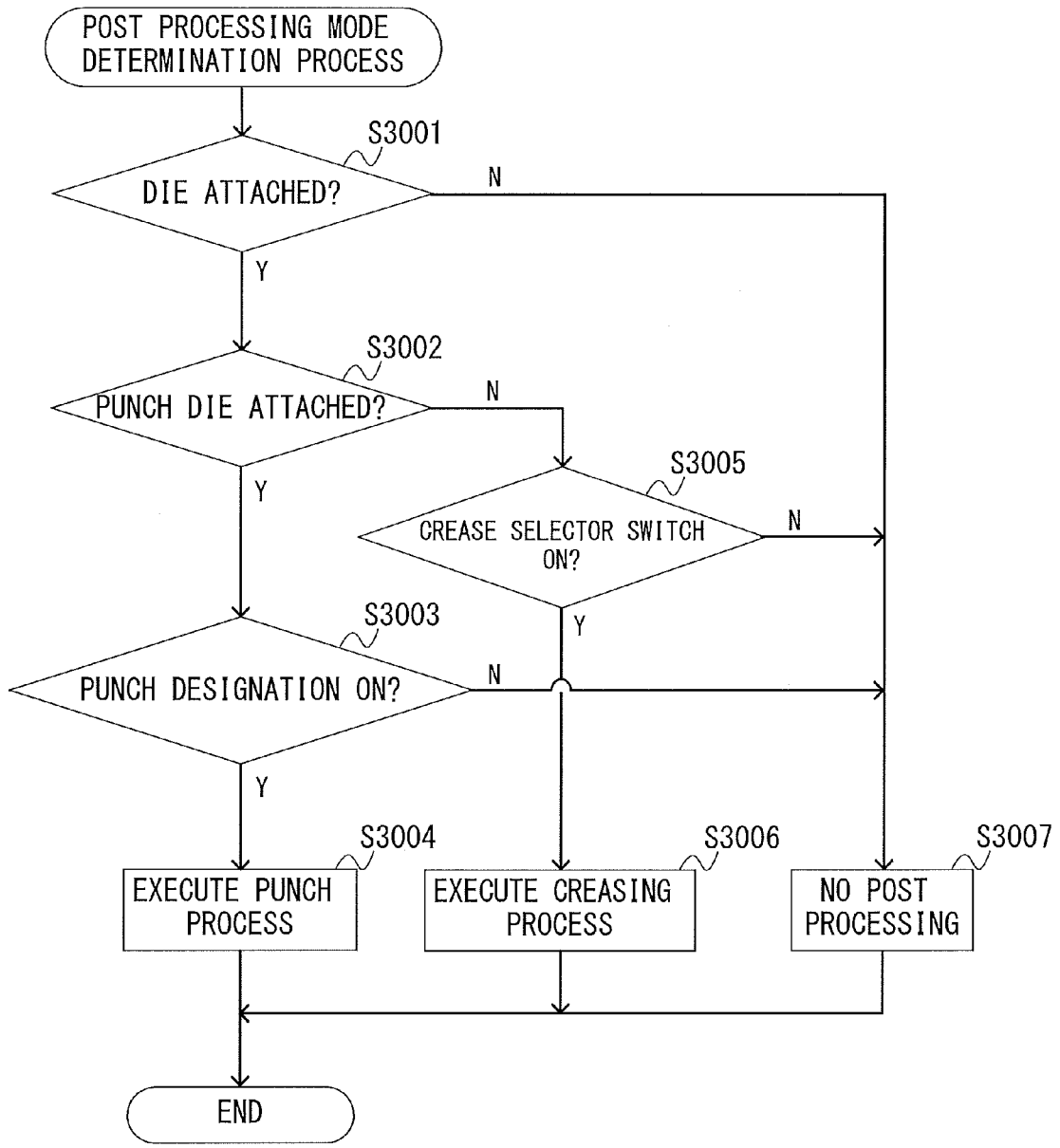
FIG. 16 is a flowchart for illustrating determining processing of a post-processing mode.

Now, the process for determining the post-processing is described. FIG. 16 illustrates a flow chart representing the process executed, when determining the post-processing by the puncher, by the CPU 972. In this embodiment, when the punching process is directed by the user, the image forming apparatus 10 notifies the sheet information indicating that a punch designation is ON or OFF to the CPU 972. Thereby, the CPU 972 receives information representing whether the post-processing using a punch die is to be executed or not from the image forming apparatus 10. Although the image forming apparatus 10 supports the punch die (first post-processing member), it does not support the die of other types, such as the crease die (second post-processing member). Therefore, for a process using the crease die etc., the CPU 972 does not receive any information to designate the process from the image forming apparatus 10.

The CPU 972 determines whether a die is attached or not (Step S3001). In a case where no die is attached (Step S3001: N), the CPU 972 proceeds to S3007, and ends the process without executing the post-processing. In a case where a die is attached (Step S3001: Y), the CPU 972 determines whether the attached die is a punch die or not (Step S2004). When a punch die is attached (Step S3002: Y), the CPU 972 determines whether a punch designation is ON in the sheet information notified from the image forming apparatus 10 (Step S3003).

When the punch designation is ON, (Step S3003: Y), the CPU 972 determines to execute the punch process (Step S3004), and ends the process. When the punch designation is not ON (i.e., OFF) (Step S3003: N), the CPU 972 ends the process, without executing the post-processing (Step S3007). When it is determined that the attached die is not a punch die (Step S3002: N), the CPU 972 determines whether the crease selector switch 283 is set to ON (Step S3005).

When the crease selector switch 283 is set to ON (Step S3005: Y), the CPU 972 executes the crease process (Step S3006), and ends the process. In a case where the crease selector switch 283 is not set to ON (Step S3005: N), the CPU 972 does not execute the post-processing (Step S3007), and ends the process. Therefore, in this case, even if the crease function is activated, the post-processing using the punch die to the sheet is not executed. As described above, in the present embodiment, it is possible to determine whether to execute either of the punching process or the creasing process, or not to execute any process, according to a setting of the crease selector switch 283 and the contents of the information from the image forming apparatus 10.

FIG. 17 illustrates a table representing how system operation is determined with the combination of the setting of the crease selector switch 283 and the notice from the image forming apparatus 10. As shown in the table in FIG. 17, in a case where the crease selector switch is set to ON, the creasing process is executed only when the new type die, which is the crease die, is attached. Further, when the punch die, which is the original (i.e., originally supported) die, is attached, in a case where the designation from the image forming apparatus 10 is ON, the punch process is executed. However, in a case where the designation from the image forming apparatus 10 is OFF, the punching process is not executed. Therefore, when the die detected by the CPU 972 is the punch die, regardless of the setting in the crease selector switch, it is determined whether to execute the post-processing or not according to the information from the image forming apparatus 10.

On the other hand, when the setting of the crease selector switch 283 is OFF, the creasing process is not executed regardless of whether the new type die is attached or not. Further, when the original die is attached, in a case where the designation from the image forming apparatus 10 is ON, the punch process is executed. However, in a case where the designation from the image forming apparatus 10 is OFF, the punching process is not executed. Further, when the punch die, which is originally supported die, is attached, it is determined, regardless of the information from the image forming apparatus 10, whether to execute the creasing process or not. It is noted that, since the image forming apparatus 10 does not support the new type die, the image forming apparatus 10 does not notify any information for designating ON or OFF for the new type die to the CPU 972. Therefore, in FIG. 17, as to the new type die, the information from the image forming apparatus 10 is illustrated as not "designated".

Second Embodiment

Now, a description is made for a second embodiment of the present invention. In the apparatus and the flow chart etc., the explanation for the portion similar to the first embodiment is omitted. In the first embodiment, the image forming apparatus 10 to which a post-processing apparatus only supports the punch die, designates ON or OFF of the punch die. In the second embodiment, in the image forming system 1, the image forming apparatus 10 corresponds to two or more types of dies. In other words, punch dies of different types are registered in the image forming apparatus 10.

(Setting of Post-Processing Mode)

Hereinafter, a description is made for a procedure for setting the post-processing by the puncher 200 with reference to FIGS. 18A, 18B and 19. The user sets the puncher 200 to execute or not to execute the post-processing on the sheet discharged from the image forming apparatus 10.

FIG. 18A illustrates a mode selector switch 289 provided on the puncher 200. On the mode selector switch 289, a post-processing ON/OFF key 290 for switching enabling/disabling of the post-processing mode is provided. Once the user presses the post-processing ON/OFF key 290, the post-processing mode is set to be enabled. If the user pushes it again, the post-processing mode is set to be disabled. In addition, the puncher 200 is provided with LED 291 which is turned on when the post-processing mode is enabled.

The sheet on which the print process etc., is executed is discharged from the image forming apparatus and conveyed to the puncher 200. The CPU 972 determines whether the die attached to the puncher 200, which serves as the post-processing apparatus, is the die which is registered in the image forming apparatus 10 or not. Then, the CPU 972 determines whether the post-processing mode is enabled by the mode selector switch 289 or not, and determines whether the post-processing is to be executed or not. The detail thereof will be described later.

In addition, as illustrated in FIG. 18B, the mode selector switch 289 may be formed with a simple display unit and soft keys. In this arrangement, the user calls a setting screen for the post-processing mode by using an up key 292 and a down key 293. For enabling the post-processing mode, the user causes "ON" button to be in a selected state and pushes "OK" key 294. For disabling the post-processing mode, the user causes "OFF" button to be in a selected state and pushes "OK" key 294. Thus, the user can determine whether the post-processing is to be enabled or disabled. The puncher control unit 971 enables or disables the post-processing mode in response to an input from the user, and then the creasing process is executed as described above.

(Die Communication Process)

Figure 19:
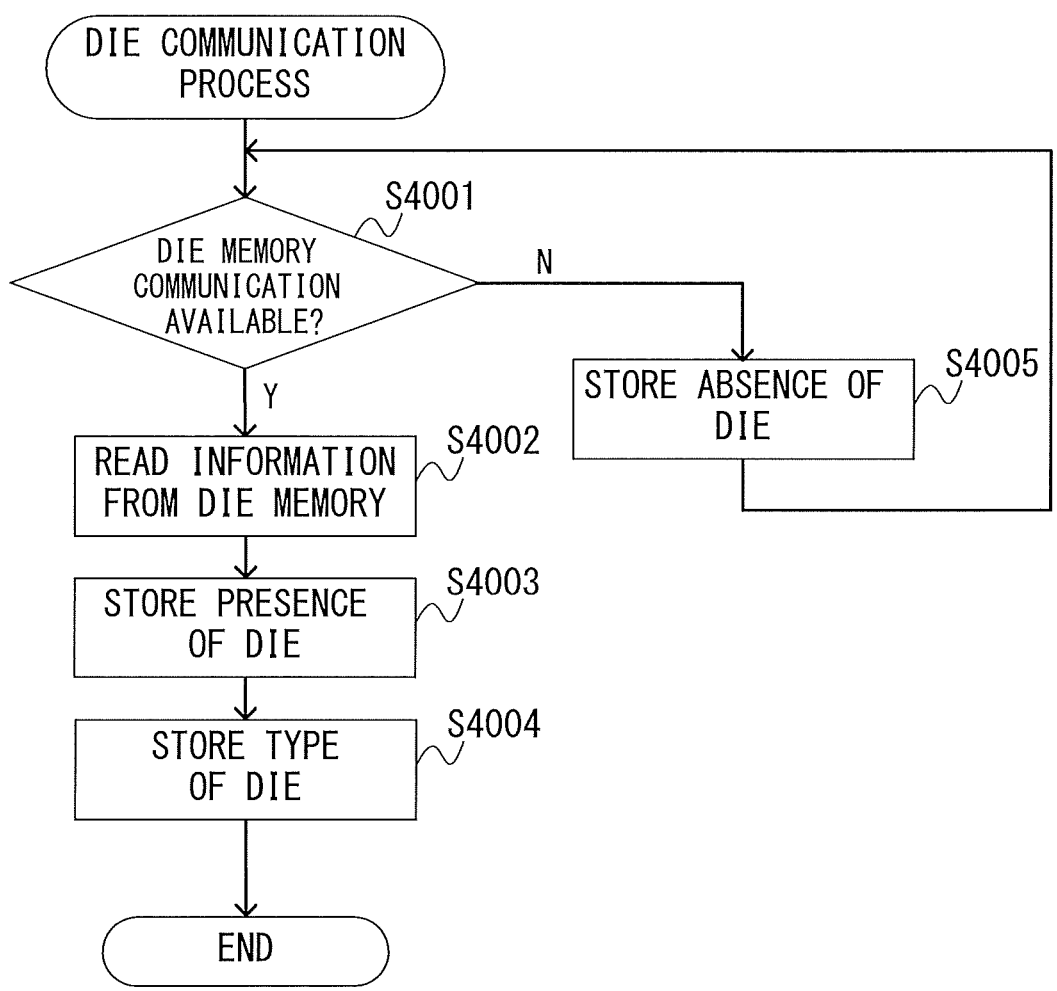
FIG. 19 is a flowchart for illustrating a die communication process in a second embodiment.

FIG. 19 is a flowchart illustrating a process executed by the CPU 972 for a die communication process in this embodiment. In this embodiment, the die memory 282 is provided for each die. In the die memory 282, information representing that the die is attached, and information for distinguishing each of the dies are stored. Further, the CPU 972 stores, with reference to the information read from die memory 282, die information on RAM 974 as information related to the die attached to the punch unit 280. In the die information, the type of the attached die is stored.

The CPU 972 determines whether the communication with the die memory 282 provided in the die is available or not (Step S4001). When the communication is not available (Step S4001: N), the CPU 972 determines that no die is attached, and stores information representing absence of the die in the RAM 974 (Step S4005), and executes S4001 again. When the communication is available (Step S4001: Y), the CPU 972 reads information from the die memory 282 (Step S4002), and stores information representing that the die is attached in the RAM 974 (Step S4003). Then, the CPU 972 stores the die type obtained from the die memory 282 in the RAM 974 (Step S4004), and ends a process.

As described above, in this embodiment, the CPU 972 determines whether a die is attached or not and determines the type of the attached die, and stores the result in the RAM 974. The information is notified to the main control unit 900 if necessary.

(Post-Processing Mode Determination Process)

Figure 20:
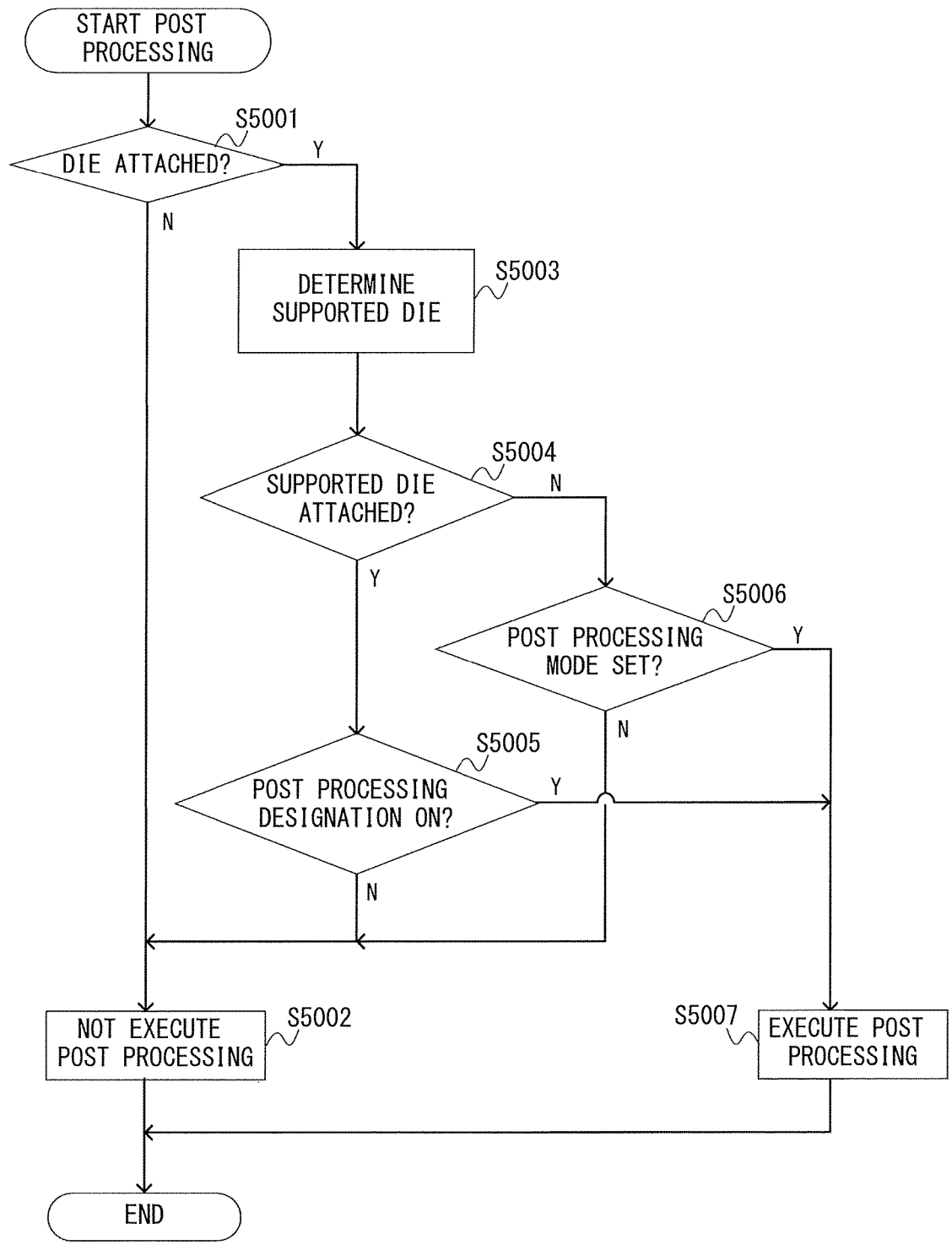
FIG. 20 is a flowchart for illustrating a process for determining a post-processing mode in a second embodiment.

Now, the process executed by the CPU 972 when the puncher determines the post-processing mode with reference to FIGS. 20, 21 and 22. FIG. 20 illustrates a flow chart representing the process executed, when determining the post-processing, by the CPU 972.

In addition, three types of dies, i.e., a first die, a second die, and a third die, are used for this example. The first die is a die which is registered in the image forming apparatus 10 (i.e., supported die), and other dies, i.e., the second and third dies, are not registered (unsupported die). Further, as in the first embodiment, the punch die is used as the first die. When the punching process using the first die is directed by the user, the image forming apparatus 10 notifies sheet information, which indicates that a designation for the post-processing using the supported die is ON or OFF, to the CPU 972. Although the image forming apparatus 10 supports the first die, i.e., the punch die, it does not support the second and third dies. Therefore, for a process using the second die and the third die, no process is designated from the image forming apparatus 10.

The CPU 972 determines whether any die is attached to the punch unit of the puncher 200 or not (Step S3001). In a case where no die is attached (Step S5001: N), the CPU 972 proceeds to S5002, and ends the process without executing the post-processing. In a case where a die is attached (Step S5001: Y), the CPU 972 determines, with reference to the die information, whether the attached die is supported or not (Step S2004). This decision is performed with reference to a correspondence table and the type of the image forming apparatus obtained from the image forming apparatus 10. The correspondence table, which is described later, represents correspondence between the type of the image forming apparatus and the supported die.

Then, the CPU 972 determines whether a supported die is attached or not (Step S5004). When the supported die is attached (Step S5004: Y), the CPU 972 determines whether or not a post-processing designation is ON with reference to the sheet information notified from the image forming apparatus (Step S5005). In this embodiment, it is determined whether the designation of a post-processing is ON or not. When the punch designation is set to ON, (Step S5005: Y), the CPU 972 executes the post-processing (Step S5007), and ends the process. In a case where the post-processing is not set to ON (Step S3005: N), the CPU 972 does not execute the post-processing (Step S5002), and ends the process.

On the other hand, when it is determined that the supported die is not attached in S5004 (Step S5004: N), the CPU 972 determines whether the post-processing mode is set in the post-processing apparatus (Step S5006). In this embodiment, the CPU 972 determines whether the post-processing mode is enabled by the mode selector switch 289 or not. When the post-processing mode is enabled (Step S5006: Y), the CPU 972 executes the post-processing (Step S5007), and ends the process. In a case where the post-processing mode is not enabled (Step S5006: N), the CPU 972 does not execute the post-processing (Step S5002), and ends the process.

Next, an example of the correspondence table representing model information is illustrated in FIG. 21. It is noted that the correspondence table is used in the decision (Step S5003) for determining that the attached die is a supported die or not. In this correspondence table, for each of the image forming apparatuses A, B, and C, whether or not the first die, the second die, and the third die are supported or not is illustrated.

The image forming apparatus A supports the first die, however, it does not support the other dies. Therefore, when the image forming apparatus A is used as the image forming apparatus 10, the determination result in S5004 in the flow chart illustrated in FIG. 20 is "Y" for the first die. For other dies, the determination result is "N". Similarly, when the image forming apparatus B is used as the image forming apparatus 10, the determination result in S5004 in the flow chart illustrated in FIG. 20 is "Y" for the first and the second dies. For the third die, the determination result is "N". Further, when the image forming apparatus C is used as the image forming apparatus 10, the determination result in S5004 in the flow chart illustrated in FIG. 20 is "Y" for all dies.

The CPU 972 determines, from the type of the image forming apparatus obtained from the image forming apparatus 10, which of the image forming apparatus A, B and C corresponds to the image forming apparatus 10. Further, from the type of the die registered in the die information, it is determined whether the die is supported by the image forming apparatus 10 or not.

FIG. 22 illustrates a table representing how system operation is determined with the combination of the setting of the mode selector switch 289, and the notice from the image forming apparatus 10. As shown in the table in FIG. 22, in a case where the mode selector switch 289 is set to ON, the post-processing is executed when unsupported die is attached. Further, when the supported die is attached, according to the designation from the image forming apparatus 10, the supported die executes the punch process.

On the other hand, in a case where the mode selector switch 289 is set to OFF, the post-processing is not executed even if the unsupported die is attached. Further, when the supported die is attached, in a case where the designation from the image forming apparatus 10 is ON, the punch process is executed. However, in a case where the designation from the image forming apparatus 10 is OFF, the punching process is not executed. It is noted that the image forming apparatus 10 does not designate ON or OFF for the unsupported die, since the unsupported die is not registered in the image forming apparatus 10. Therefore, in FIG. 22, as to the unsupported die, the information from the image forming apparatus 10 is illustrated as "no designation".

Post-processing is determined to be executed or not as described above, even if the mode selector switch 289 is ON. In a case where the designation to the correspondence die from the image forming apparatus 10 is OFF and the supported die is attached, the post-processing with the supported die is not executed. Therefore, it is possible to prevent the user from undesired executing of the post-processing with the supported die.

In a case where the mode selector switch 289 is ON and the designation from the image forming apparatus 10 is ON, it is possible to operate the unsupported die as illustrated in FIG. 22. That is, when the supported die is attached, regardless of the setting of the mode selector switch 289, the post-processing mode designated from the image forming apparatus 10 is executed. Further, when the unsupported die is attached, according to the setting of the mode selector switch 289, it is determined whether the post-processing is to be executed or not.

As describe above, in the second embodiment, based on the information notified from the image forming apparatus 10 and the information stored in the post-processing apparatus, it is determined whether the attached die is supported by the image forming apparatus 10 or not. Alternatively, the image forming apparatus 10 may directly notify whether the die is supported or not.

In the example described above, the CPU 972 of the puncher 200, which is the post-processing apparatus, determines whether the attached die is supported by the image forming apparatus 10 or not. In this case, the determination is made with reference to the correspondence table, which represents correspondence between the type of the image forming apparatus and the supported die, illustrated in FIG. 21. However, this determination can also be made by the image forming apparatus 10. In this case, the information for identifying the die obtained from the die memory 282 is sent to the image forming apparatus 10, and the main control unit 900 of the image forming apparatus 10 makes determination with reference to the correspondence table in FIG. 21. Therefore, the CPU 972 of the post-processing apparatus does not need to access the correspondence table in FIG. 21.

In this case, in a case where "ON" or is designated for the identified die in the information obtained from the image forming apparatus 10, in FIG. 22, the CPU 972 determines that the attached die is supported by the image forming apparatus 10. Further, in a case where "no designation" is designated in the information from the image forming apparatus 10, it is determined that the attached die is not supported by the image forming apparatus 10. As described above, in the second embodiment, it is possible to determine whether to execute the post-processing based on the type of the attached die and with a suitable setting manner. As a result, it is possible to prevent the user from undesired post-processing. Further, according to the present invention, it is possible to detect the die attached to the post-processing apparatus and to suitably determine whether or not to execute the post-processing, based on the information from the image forming apparatus and the setting, by the user, for determining whether to enable the post-processing or not.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158430, filed Aug. 10, 2015, which is hereby incorporated by reference wherein in its entirety.

What is claimed is:

1. A post-processing apparatus configured to perform post-processing, using an attached post-processing member, on a sheet received from an image forming apparatus, and one of a first post-processing member and a second post-processing member is selectively attached thereto as the post-processing member, comprising:
   a detection unit configured to detect a type of the attached post-processing member;
   a control unit configured to receive an instruction from the image forming apparatus and control an execution of the post-processing using the attached post-processing member; and a setting switch configured to receive, from a user, a setting of whether or not to enable the post-processing using the second post-processing member, wherein the control unit is further configured to:

in a case where the type of the post-processing member detected by the detection unit corresponds to the first post-processing member, regardless of the setting of the setting switch, determine whether to execute the post-processing using the first post-processing member based on presence or absence of an instruction to execute the post-processing using the first post-processing member from the image forming apparatus, and in a case where the type of the post-processing member detected by the detection unit corresponds to the second post-processing member, determine whether to execute the post-processing using the second post-processing member based on the setting of the setting switch.

2. The post-processing apparatus according to claim 1, wherein:

the post-processing member includes a memory in which information for identifying a type of the post-processing member is stored, and the detection unit is further configured to detect whether the attached post-processing member is the first post-processing member or the second post-processing member based on the information read from the memory.

3. The post-processing apparatus according to claim 1, wherein the post-processing apparatus is configured to, in a case where the second post-processing member is attached to the post-processing apparatus, determine whether to perform the post-processing using the second post-processing member according to the setting of the setting switch and regardless of information related to the post-processing using the first post-processing member obtained from the image forming apparatus.

4. A post-processing apparatus for performing post-processing on a sheet received from an image forming apparatus using a post-processing member attached thereto, comprising:

an identifying unit configured to identify a type of the attached post-processing member;

a control unit configured to receive an instruction from the image forming apparatus and control an execution of the post-processing using the attached post-processing member; and a setting switch configured to receive, from a user, a setting of whether or not to enable the post-processing using the post-processing member in the post-processing apparatus, wherein the control unit is further configured to:

in a case where a type of the post-processing member identified by the identifying unit is a first type, regardless of the setting of the setting switch, determine whether to execute the post-processing using the first type post-processing member based on presence or absence of an instruction to execute the post-processing using the first type post-processing member from the image forming apparatus, and in a case where a type of the post-processing member identified by the identifying unit is a second type, determine whether to execute the post-processing using the second type post-processing member based on the setting of the setting switch.

5. The post-processing apparatus according to claim 4, wherein:

the post-processing member further includes a memory in which information for identifying a type of the post-processing member is stored, and the identifying unit is configured to identify a type of the attached post-processing member based on the information read from the memory.

6. The post-processing apparatus according to claim 4, wherein the control unit is further configured to, in a case where a type of the identified post-processing member is the second type, determine whether to perform the post-processing using the identified post-processing member according to the setting of the setting switch and regardless of information obtained from the image forming apparatus.

7. A method for controlling a post-processing apparatus configured to perform post-processing, using an attached post-processing member, on a sheet received from an image forming apparatus, and one of a first post-processing member and a second post-processing member is selectively attached thereto as the post-processing member, comprising:

detecting a type of the attached post-processing member;

receiving, from a user, a setting of whether or not to enable the post-processing using the second post-processing member using a setting switch provided in the post-processing apparatus;

in a case where the detected type of the post-processing member corresponds to the first post-processing member, regardless of the setting of the setting switch, determining whether to execute the post-processing using the first post-processing member based on presence or absence of an instruction to execute the post-processing using the first post-processing member from the image forming apparatus; and in a case where the detected type of the post-processing member corresponds to the second post-processing member, determining whether to execute the post-processing using the second post-processing member based on the setting of the setting switch.

8. A method for controlling the post-processing apparatus for performing post-processing on a sheet received from an image forming apparatus using a post-processing member attached thereto, comprising:

identifying a type of the attached post-processing member;

receiving, from a user, a setting of whether or not to enable the post-processing by the post-processing member in the post-processing apparatus using a setting switch provided in the post-processing apparatus;

in a case where a type of the identified post-processing member is a first type, regardless of the setting of the setting switch, determining whether to execute the post-processing using the first type post-processing member based on presence or absence of an instruction to execute the post-processing using the first type post-processing member from the image forming apparatus; and in a case where a type of the identified post-processing member is a second type, determining whether to execute the post-processing using the second type post-processing member based on the setting of the setting switch.

9. An image forming system comprising:

an image forming apparatus; and a post-processing apparatus configured to perform post-processing, using an attached post-processing member, on a sheet received from the image forming apparatus, and one of a first post-processing member and a second post-processing member is selectively attached thereto as the post-processing member, wherein the image forming apparatus includes a first setting unit configured to receive, from a user, a first setting of whether or not to enable the post-processing using the first post-processing member, wherein the post-processing apparatus comprises:
a detection unit configured to detect whether the attached post-processing member is the first post-processing member or the second post-processing member;
a control unit configured to receive an instruction from the image forming apparatus and control an execution of the post-processing using the attached post-processing member; and
a setting switch configured to receive, from a user, a setting of whether or not to enable the post-processing using the second post-processing member, and wherein the control unit is further configured to:
in a case where the detected type of the post-processing member corresponds to the first post-processing member, regardless of the setting of the setting switch, determine whether to execute the post-processing using the first post-processing member based on the first setting from the image forming apparatus, and
in a case where the detected type of the post-processing member corresponds to the second post-processing member, determine whether to execute the post-processing using the second post-processing member based on the setting of the setting switch.

10. An image forming system comprising:
an image forming apparatus; and
a post-processing apparatus for performing post-processing on a sheet received from the image forming apparatus using a post-processing member attached thereto,
wherein the image forming apparatus comprises a first setting unit configured to receive, from a user, a first setting of whether or not to enable the post-processing using the post-processing member of the type registered in the image forming apparatus among a plurality of types of post-processing member, and
wherein the post-processing apparatus comprises:
an identifying unit configured to identify the post-processing member attached to the post-processing apparatus;
a control unit configured to receive an instruction from the image forming apparatus and control an execution of the post-processing at the post-processing apparatus using the attached post-processing member; and
a setting switch configured to receive, from a user, a setting of whether or not to enable the post-processing by the post-processing member, and
wherein the control unit is further configured to:
in a case where a type of the post-processing member identified by the identifying unit is a first type, regardless of the setting of the setting switch, determine whether to execute the post-processing using the first type post-processing member based on the first setting from the image forming apparatus, and
in a case where a type of the post-processing member identified by the identifying unit is a second type, determine whether to execute the post-processing using the second type post-processing member based on the setting of the setting switch.

11. A post-processing apparatus configured to perform post-processing, using an attached post-processing member, on a sheet received from an image forming apparatus, and one of a first post-processing member which is identifiable to the image forming apparatus and a second post-processing member which is not identifiable to the image forming apparatus is selectively attached thereto as the post-processing member, wherein the post-processing apparatus comprises:
a detection unit configured to detect a type of the attached post-processing member;
a control unit configured to control an execution of the post-processing using the attached post-processing member; and
a setting unit configured to receive a setting, which is input from the user, of whether or not to enable the post-processing using the second post-processing member,
wherein the control unit is configured to:
in a case where the post-processing member detected by the detection unit is the first post-processing member, determine whether to perform the post-processing using the first post-processing member according to the designation from the image forming apparatus,
in a case where the post-processing member detected by the detection unit is the second post-processing member, determine whether to perform the post-processing using the second post-processing member according to the setting input by the setting unit.

12. An image forming system including an image forming apparatus and a post-processing apparatus, the post-processing apparatus is configured to perform post-processing, using an attached post-processing member, on a sheet received from the image forming apparatus, and one of a first post-processing member which is identifiable to the image forming apparatus and a second post-processing member which is not identifiable to the image forming apparatus is selectively attached thereto as the post-processing member, wherein:
the image forming apparatus comprises a setting unit configured to receive, from a user, a first setting of whether or not to enable the post-processing using the first post-processing member,
the post-processing apparatus comprises:
a detection unit configured to detect whether the attached post-processing member is the first post-processing member or the second post-processing member;
a control unit configured to control an execution of the post-processing using the attached post-processing member; and
a second setting unit configured to receive, from a user, a setting to enable the post-processing using the second post-processing member, and
the control unit is further configured to:
in a case where the post-processing member detected by the detection unit is the first post-processing member, determine whether or not to perform the post-processing using the first post-processing member according to the first setting from the image forming apparatus,
in a case where the post-processing member detected by the detection unit is the second post-processing member, determine whether to perform the post-processing using the second post-processing member according to the second setting input from the second setting unit.

\* \* \* \* \*